United States Patent [19]

Menzel et al.

[11] Patent Number: 4,566,496
[45] Date of Patent: Jan. 28, 1986

[54] TUBULAR PLASTICS OBJECTS

[75] Inventors: Stanley W. O. Menzel, San Diego; David E. Mominee, Alpine; Gilbert W. Vance, Jamul, all of Calif.

[73] Assignee: J-M Manufacturing Company, Inc., Stockton, Calif.

[21] Appl. No.: 491,744

[22] Filed: May 5, 1983

Related U.S. Application Data

[63] Continuation of Ser. No. 310,693, Oct. 13, 1981, abandoned.

[51] Int. Cl.⁴ .............................................. F16L 9/16
[52] U.S. Cl. ................................... 138/154; 138/122; 138/129; 428/192
[58] Field of Search ................ 138/122, 129, 135, 154; 428/36, 192

[56] References Cited

U.S. PATENT DOCUMENTS

| | | | |
|---|---|---|---|
| 2,739,089 | 3/1956 | Hageltorn | 138/129 X |
| 4,062,380 | 12/1977 | Hofle | 138/154 X |
| 4,209,043 | 6/1980 | Menzel | 138/154 |

Primary Examiner—James E. Bryant, III
Attorney, Agent, or Firm—Joseph J. Kelly

[57] ABSTRACT

The formation of tubular objects by spirally winding and seaming a relatively rigid strip of plastics material. A sealing flap (15, 215) along one longitudinal edge (5, 25) of the strip, and an engaging surface (16, 216) along the other edge (11, 211) positioned close to but separate from the interlocking portions (8 and 12, 28, 212) of these longitudinal edges. The provision of these sealing flaps and engaging surfaces permit the interlocking portions at the edges to be designed independent of the ability of these interlocking portions to create a fluid seal. This results in optimum operation of these interlocking portions to, for example, permit relatively rapid changes in the diameter of the tube as it is formed, as well as subsequent to its formation.

6 Claims, 2 Drawing Figures

TUBULAR PLASTICS OBJECTS

This is a continuation of application Ser. No. 310,693, filed Oct. 13, 1981, now abandoned.

BACKGROUND OF THE INVENTION

In the past, generally, spirally wound tubes formed from plastics have been made from soft rubber-like plastics or from rigid plastics that have been heated and softened and then wound into a spiral tubular configuration.

In U.S. Pat. No. 4,209,043, Julian M. Menzel, a new approach is described according to which a unique ribbed ribbon is used. The ribbon is shaped so that a spirally wound tube can be produced with interlocking edges of the ribbon formed by the shape of the ribs on the ribbon itself.

Also known is a machine for spirally winding such a strip to produce an elongated tubular article. In the operation of this machine, a differential pressure or force is applied to the parts of the strip being brought into contact with one another for interlocking the edges of the ribbon to form a spiral joint. These parts are fed under differential force so that the diameter of the tube can be controlled according to the extent of the difference in the force applied to the two interengaging edges. Also, the method of interengaging the two edges of the tube which are to be locked together is such that the application of this differential force forces these interengaging edges firmly together to give an effective joint.

However, it is possible to wind such strip on a mandrel. But whether the machine described above is used to produce the tube, or whether a mandrel is used, it is only possible to maintain control over relatively very minor changes in diameter that can occur during the winding process.

It is an object of the present invention to provide certain improvements to the form of the strip which will allow greater changes in diameter to occur during the actual winding of the strip into a tube, and such changes in diameter can be relatively rapid or quite slow, to give approximately a range of from 1° of taper to 20° or more of taper.

It is a further object of the invention to so construct the spiral joint that, even when made of a very rigid plastic for a tube of considerable rigidity, either with ribs as an outer part of the configuration, or the ribs as an inner part of the configuration, or both, the strip can readily be spirally wound into a tube, yet have a spiral seam of each integrity that it will seal into a watertight joint with or without the need for using a sealing compound.

This special feature is achieved by using a particular type of snap lock continuous joint which is so designed that when snapped into place, by whatever means, for example by means of a pair of pinch rollers in one type of the above-described tube forming machines, the spiral joint will seal and yet still allow itself to be manipulated into a larger or smaller diameter anywhere along the length of the tube by simply applying a circumferential twisting moment, applied either within the confines of the above-described machine which is winding the tube, or even after the tube has been wound.

BRIEF DESCRIPTION OF THE INVENTION

The invention comprises an improved elongated strip which includes a member, namely a sealing flap, which is generally parallel and flush with the main body portion of the strip, and thus the inner wall of the tube made thereby, extending substantially at right angles to the portion of the locking device, namely upstanding rib; which rib is generally of the type as described in the earlier referred to U.S. Pat. No. 4,209,043.

The member or sealing flap extends across the actual spiral seam joint onto the adjacent wall from which the opposite portion of the lock, namely the socket which receives the headed rib, is extended, and in this portion of the wall there is a recess equal to the dimensions of the aforementioned extended member or sealing flap, which is of such a configuration that its extreme edge can be feathered so that it tends to be somewhat resilient even in a rigid plastics material, so that when internal pressure is applied to the finished spirally wound tube, this extended member or sealing flap, with its feathered edge, will increase the seal.

However, in the case where external pressure is applied, the mating surfaces can be bonded together thus providing a relatively large continuous sealing surface.

In addition, the extending member or sealing flap can have locking protuberances on its upper surface that can engage in the configuration created in the surface of the mating parts.

This construction results in a locking device in which the joint can slide within itself, and as changes in diameter are required it is just a matter of circumferentially clinching the spiral tube with a differential movement within the confines where changes of diameter are required.

All these configurations can be carried out using a rigid plastic profile that is at ambient temperature, which of course adds to the features because of the spring-like tension imparted to the plastics profile when wound into a tube allowing it to naturally take a circular configuration which of course is important in order that the sliding between the two parts of the joint can occur.

More specifically, to facilitate sliding along the joint, the multiple barbs of the locking device of Menzel, U.S. Pat. No. 4,209,043, are eliminated in favor of a single enlarged head or hook which is received within a mating recess or socket. In addition, the components of the locking device are provided with increased clearance space to further facilitate the sliding movement necessary to allow changing of the diameter of the tube. However, the increased clearance space correspondingly increases the likelihood of fluid leakage through the joint, and to seal the joint, the sealing member, namely the sealing flap referred to above, can be employed.

In order, however, to enable the nature of the invention to be more fully appreciated, but without necessarily limiting the invention to the form illustrated, embodiments are shown in the accompanying drawing in which:

DETAILED DESCRIPTION OF THE INVENTION

Figure 1:
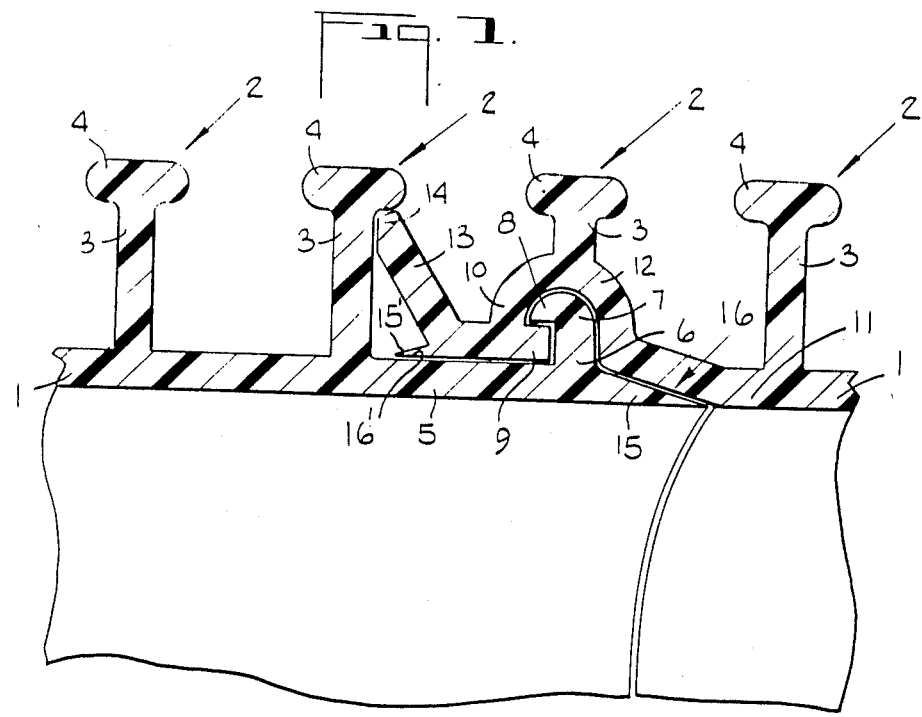
FIG. 1 is a portion of a tube in cross section showing the two edges of the strip which interlock to form a sprial seam.

In FIG. 1, the body portion 1 of the strip has a number of upstanding webs 2 on it, each of which have webs or enlarged end portions 4 of preferably a "tee" configuration. That is, webs 2 comprise the upstanding portion 3 and the enlarged end portion 4. The functions of these webs are more fully set forth in the above-referenced U.S. Pat. No. 4,209,043, which patent, to the extent it is consistent with this disclosure, is hereby incorporated by reference. Also, as in this U.S. patent, a first longitudinal edge 5 of the strip has a shorter locking rib 6. However, in this invention this rib 6 is headed and is provided with a hook 7 at its top arranged to form a ridge 8 to engage, when wound into tubular form, a corresponding ridge 9 of extension 10 at the second longitudinal edge 11 of the body portion 1 of the strip. The web portion 3 including a socket 12 which mechanically locks over the locking rib 6. Lock-web 13 projects angularly upwardly so that this part 13 can have its extreme edge 14 engage beneath the enlarged end portion 4 of the first full web 3 at the first edge 5 of the strip such as more fully set forth in the above-referenced patent.

An extended tapering sealing flap 15 is provided on the edge 5 of the strip and outwardly beyond the shorter locking rib 6. The sealing flap 15 is arranged to engage a mating surface 16 on the second edge 11 of the strip body portion 1 on the side of the body portion 1 opposite socket 12 when pressure is exerted on the inside of the tube. The relatively thin and resilient sealing flap 15 is forced against the mating surface 16 to increase the fluid-tight seal in the manner of a hydraulic cup washer.

An optional feature of the invention is to the provision of a second resilient sealing flap 15' which is integral with the lock-web 13 and which projects axilly from the base of the lock-web 13. With the strip joined together in a tubular form, the sealing flap 15' resiliently engages a corresponding mating surface 16' on the outer surface of the body portion 1 to seal the tube against the ingress of fluids, such as water.

Figure 2:
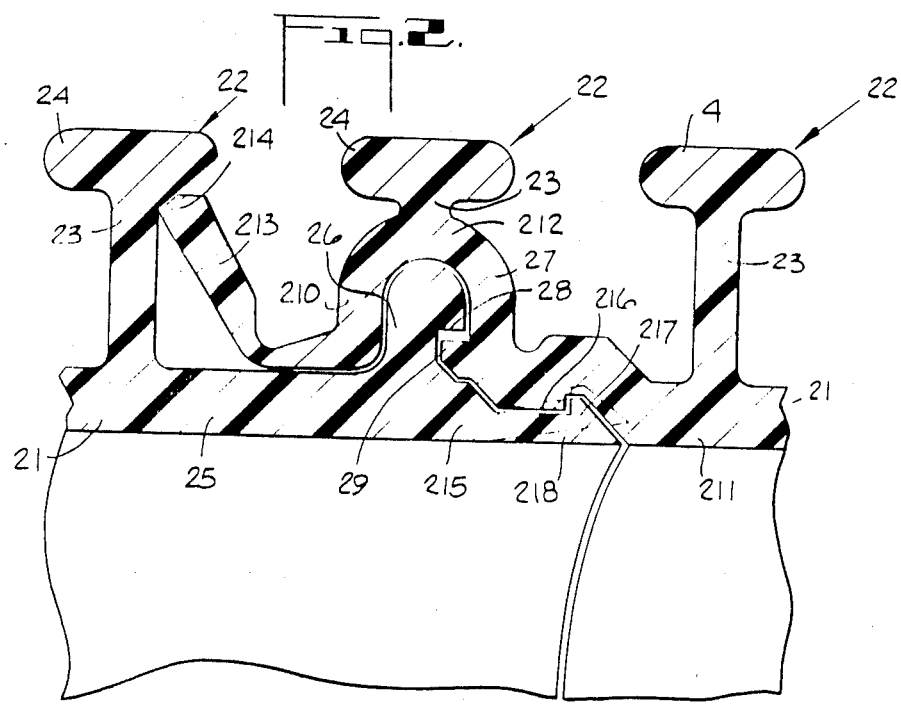
FIG. 2 shows a further embodiment of the invention similar to that of FIG. 1.

FIG. 2 shows a portion of a tube which is formed with a strip which is identical to the strip shown in FIG. 1 in all respects not shown or described herein. However, portions of the tube and the strip of FIG. 2 corresponding to those shown in FIG. 1 are designated by corresponding reference characters preceeded by the numeral 2. Here, the first edge 25 of the body portion 21 of the strip includes sealing flap 215 which further includes a hook-like edge portion 217. Also, flap 215 differs from sealing flap 15 of FIG. 1 in that flap 215 also includes an elongated central portion 218 of generally uniform thickness interconnecting the first portion of flap 215 connected to body portion 21 with the hook portion 217. The extreme edge of flap 215 is feathered as in FIG. 1. The other edge 211 of body portion 21 includes a mating surface 216 comprising a recess which is shaped to conform to the upper surface of sealing flap 215.

Ridge 28 of hook 27 in this embodiment faces the opposite direction from that shown in FIG. 1. Although the operation is essentially identical, the corresponding ridge 29 of the extension 210 preferably is spaced from ridge 28 in order to provide a slight clearance.

As in the embodiment of FIG. 1, the strip and tube formed thereby of FIG. 2 employs the sealing flap 215 and the mating surface 216 to provide most, if not all, of the fluid sealing function. The addition of the hook portion 217 and the corresponding portion of the mating surface 216 has a further advantage in assuring alignment and mating of flap 215 with surface 216.

The slight clearance between ridges 28 and 29 permit a slight displacement of edge 211 relative to edge 25 of the strip in order to facilitate rapid changes in the diameter of the tube formed thereby. This slight radial displacement, either brought on by the operation of the above-referenced machine (via the application of the differential force as the spiral seam is formed) or by subsequent manipulation of the strip in the tube form, has little or no effect on the sealing function provided by the sealing flap 215 and mating surface 216. It will be realized from the foregoing that, so far as longitudinal movement of the one edge 5 or 25 of the strip in relation to the other edge 11, 211 of the strip is concerned, the arrangement is such that the one edge of the strip can move in relation to the other interengaging edge of the strip to allow the changes in diameter to be effected as opposed to the more rigid form of interlocking disclosed in U.S. Pat. No. 4,209,043. In this patent, the differential movement existed primarily for the purpose of forcing the joint together and for maintaining a given constant diameter, but generally could not allow any significant sliding movement thereafter without the exertion of considerable force in the form of a circumferential twisting moment during winding of the tube. With this invention, however, sufficient clearance is provided between the short rib 6 or 26 and the socket 12 or 215 to allow significant sliding movement between these interengaging portions to thereby allow the diameter of the tube formed from the strip to be increased or decreased as desired. The sealing flap 15 cooperates with the mating surface 16 to seal the joint, notwithstanding the clearance space referred to above.

Clearance between the locking rib and socket of the disclosed embodiments is not necessary to the operation of the disclosed invention. Indeed, a relatively snug fit between the locking rib 6 or 26 and the socket 12 or 212 respectively can be tolerated and in some cases desired, depending on the structural characteristics of the strip itself (the stiffness, etc.), the frictional characteristics of the material used (whether the material is PVC or PTFE, each of which have vastly different frictional co-efficients), and whether the tube to be formed from the strip is to have a relatively constant diameter or a diameter which rapidly changes. What is most significant is that the provision of a sealing flap as disclosed permits these interlocking features on the edges to be designed to fulfill a mechanical interlocking function without regard to whether their ultimate design would result in an adequate fluid seal. This fluid seal function, of course, is entirely or at least mostly fulfilled by the separately provided sealing flap and mating surface. Due to the relatively flexible and/or resilient nature of the sealing flap, its sealing engagement with the corresponding mating surface would effect only minimally the operation of the remainder of the seam structure.

The sealing flaps 15, 15', and 215 can be longitudinally corrugated at the mating surface or otherwise formed to still further increase the sealing action. Also, for example, a thermoplastic material of a softer characteristic than the rest of the strip could be extruded onto mating surfaces 16, 16', or 216, or sealing flaps 15, 15', or 215 by known techniques to aid in sealing at these mutually mating surfaces. Also, sealing flaps 15, 15', and 215 could be initially formed so as to be mechanically deflected by their respective mating surfaces 16, 16' and 216 when interengaged in the tube forming process, thus forming a continuous seal which is biased closed. FIG. 2 shows sealing flap 215 in phantom in its position as initially formed and prior to engaging mating surfaces 216. The final sealing position is as shown.

In one embodiment of the invention, a strip of unplasticized PVC having longitudinal edges as in FIG. 2 had a total width from the outer edge of lock-web 213 to the feathered edge 218 of sealing flap 215 of about 20 cm. The total thickness of the strip was about 2.5 cm and the body portion 21 had a thickness of about 0.5 cm. The thickness of the elongated central portion of sealing flap 215 was about one-half the thickness of body portion 21 or about 0.25 cm. This sealing flap extended outwardly past the headed rib 26 away from the rest of the strip about 1.8 cm. The hook portion 217 had a maximum thickness of about 0.381 cm. Tubes and pipes made from this strip were wound on the machine described supra. The tubes could be made to have a constant diameter ranging from about 45 cm to about 122 cm, and could be made to have a rapidly changing diameter as the strip was spirally would and the edges interengaged. A solvent cement was placed within the seam structure. The resulting seam was water-tight.

We claim:

1. In a tube comprising an elongated strip having a body portion with two longitudinal edges, the strip being spirally wound to overlap and interlock said two longitudinal edges, a first of said longitudinal edges including a locking rib and a second of said longitudinal edges including a longitudinal socket sized to mechanically receive and engage said locking rib, the improvement comprising one of said longitudinal edges has a sealing flap extending laterally from said generally parallel to said body portion, said sealing flap being resilient relative to said body portion, said sealing flap having a surface for sealing engagement with the other of said longitudinal edges, said surface having a locking protuberance extending therealong, the other of said longitudinal edges including a mating surface on said body portion in engagement with said surface of said sealing flap, said mating surface comprising a recess which is shaped to conform to said surface of said flap whereby said tube includes a helically extending, fluid-tight seam.

2. A tube as set forth in claim 1 wherein said locking protuberance comprises a hook-like edge portion projecting out from said surface, said hook-like edge portion tapering to a feathered edge at the outermost edge of said sealing flap.

3. A tube as set forth in claim 1 wherein said sealing flap has been mechanically deflected by said mating surface to form a continuous seal which is biased closed.

4. In a tube comprising an elongated strip having a body portion with two longitudinal edges, the strip being spirally wound to overlap and interlock said two longitudinal edges, a first of said longitudinal edges including a locking rib and a second of said longitudinal edges including a longitudinal socket sized to mechanically receive and engage said locking rib, the improvement comprising one of said longitudinal edges has a sealing flap extending laterally from and generally parallel to said body portion, said sealing flap being resilient relative to said body portion and comprising a locking protuberance and a central portion interconnecting said locking protuberance with said body portion, said central portion having a thickness dimension substantially less than the thickness dimension of said body portion, the other of said longitudinal edges including a mating surface on said body portion in engagement with said locking protuberance of said sealing flap, whereby said tube includes an helically extending fluid-tight seam.

5. A tube as set forth in claim 4 wherein said locking protuberance comprises a hook-like edge portion which tapers to a feathered edge at the outermost edge of said sealing flap.

6. A tube as set forth in claim 4 wherein said sealing flap has been mechanically deflected by said mating surface to form a continuous seal which is biased closed.

* * * * *